(12) United States Patent
Turney et al.

(10) Patent No.: US 6,530,620 B1
(45) Date of Patent: Mar. 11, 2003

(54) SUN VISOR FOR VEHICLE

(75) Inventors: James Clayton Turney, Portland, OR (US); Michael Ian Dawson, Aloha, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 10/194,041

(22) Filed: Jul. 12, 2002

(51) Int. Cl.⁷ .................................................. B62D 35/00
(52) U.S. Cl. .................. 296/180.2; 296/97.1; 296/97.9; 296/95.1; 296/208; 160/DIG. 3
(58) Field of Search .......................... 296/180.1, 180.2, 296/97.1, 97.9, 95.1, 208; 160/DIG. 3, 370.21

(56) References Cited

U.S. PATENT DOCUMENTS

| | | |
|---|---|---|
| 1,595,145 A | 8/1926 | Duthie |
| 2,028,542 A | 1/1936 | Gluhareff |
| 2,037,942 A | 4/1936 | Stalker |
| 2,206,793 A | 7/1940 | Staubly |
| 4,022,508 A | 5/1977 | Kirsch |
| 4,199,185 A | 4/1980 | Woolcock |
| 4,320,919 A | 3/1982 | Butler |
| 4,441,753 A | 4/1984 | Mason |
| D375,475 S | 11/1996 | Smiarowski |
| 5,636,892 A | 6/1997 | Gordon |
| 5,836,640 A | 11/1998 | Hurayt et al. |
| 5,851,044 A | 12/1998 | Lund |
| D403,999 S | 1/1999 | Lund |
| 6,099,064 A | 8/2000 | Lund |

*Primary Examiner*—Joseph D. Pape
(74) *Attorney, Agent, or Firm*—Klarquist Sparkman LLP

(57) ABSTRACT

A sun visor comprises a front and a back and is desirably configured and mounted in a way to generate positive lift in a direction approximately normal to the back surface of the sun visor. A sun visor in accordance with one embodiment comprises a back, which may be of a plural section construction, designed for mounting to a front sun visor member. The front member and back may define a wiring receiving passage to receive wiring for lamps mounted to the sun visor. The sun visor back may have an upper edge portion that terminates in general at a location which is above the location of any lamps mounted to the sun visor.

25 Claims, 7 Drawing Sheets

SUN VISOR FOR VEHICLE

CROSS REFERENCE

This application is based on and claims the benefit of provisional patent application Ser. No. 60/392,781 filed on Jun. 28, 2002. The entire disclosure of the provisional application is considered to be part of the disclosure of the following application and is hereby incorporated by reference herein.

BACKGROUND

The present invention relates to sun visors for vehicles. Aspects of the invention relate to a sun visor construction which is mounted to provide lift as a result of air flow passing over the forward and reverse sides of the sun visor.

Sun visors of various constructions are known for shielding the passage of sunlight through an upper portion of the windshield of a vehicle.

However, known sun visors often have a rear surface which causes a substantial amount of turbulence as air passes over the front and rear surfaces of the sun visor during vehicle travel. This turbulence can add to the drag generated by the sun visor.

In addition, known sun visors have been mounted to vehicles in a manner where they significantly add to the drag produced by the sun visor as a result of air passing along the sun visor surfaces in comparison to the drag if the sun visors were mounted in a different orientation.

With the cost of fuel in today's economy, very small percentage improvements in the drag generated by a sun visor on a truck or other vehicle travelling at highway speeds (e.g., 55 miles per hour to 65 miles per hour) can result in significant savings over the operating life of the vehicle. These savings are particularly apparent in connection with trucks, which can be operated for hundreds of thousands of miles, and in many cases in excess of a million miles, during their life.

In addition, sun visors with lamps or marker lights included therein may have exposed wiring or lamps at the rear of the sun visor, which can decrease the aerodynamic efficiency of the sun visor.

Moreover, sun visors may be of relatively complex and difficult to manufacture shapes.

The present invention is directed toward sun visors with novel and non-obvious characteristics as set forth in the claims below. These sun visors may solve one or more of the disadvantages of the prior art, but the invention is not limited to the specific embodiments shown herein nor to sun visors with all or specific subcombinations of features. That is, the invention is directed toward novel and non-obvious sun visor aspects both alone and in various combinations and subcombinations with one another.

SUMMARY

In accordance with one aspect of an embodiment, an elongated sun visor is provided for mounting to a vehicle in a position to shield a portion of an upwardly extending windshield of the vehicle from overhead sunlight. The vehicle typically comprises an upright vehicle front section, having a vehicle front surface section extending upwardly above the windshield. Desirably, the vehicle front surface section substantially follows the contour of the upwardly extending windshield at least for a distance above the windshield. This vehicle front surface section may be formed by a portion of the vehicle roof, such as in a raised roof truck configuration, by a fairing mounted to the vehicle roof, or in any other convenient manner. Typically, at least one sun visor support is provided for coupling the sun visor to the vehicle to support the sun visor. The sun visor support is desirably coupled to at least the upright vehicle front section.

The sun visor may comprise an elongated sun visor front having a length and comprising top and bottom edge portions. The sun visor front in one form comprises a first major front surface and a second major back surface. Desirably, when the sun visor is mounted to the vehicle, the sun visor first major surface is substantially parallel to the vehicle front surface section. Plural marker or other lights may be coupled to the sun visor front so as to be visible from the front of the vehicle when the lights are operated. An elongated sun visor back desirably extends at least along a major portion of the second major back surface of the sun visor front. The sun visor back may comprise a lower back portion which together with a lower portion of the sun visor front in this embodiment defines an elongated enlarged lower sun visor section. This enlarged lower section may define at least one elongated wiring receiving passage for receiving electrical wiring for the lights. In addition, the passage may be sized to accommodate rear surfaces of lamps mounted to the sun visor front. The forward surfaces of the lamps, or lenses attached to the lamps, may be substantially flush with the first major front surface of the sun visor front. The sun visor back may also comprise a transition back portion which extends upwardly from the lower back portion and converges toward the major back surface of the sun visor front. A sun visor back may extend upwardly to the top edge portion of the sun visor front but more desirably comprises an upper edge portion which terminates below the sun visor top edge portion and generally above the lights.

The sun visor back in one embodiment may comprise at least one back section which is a separate piece from the sun visor front and which is coupled to the sun visor front to complete the sun visor construction. The sun visor back may alternatively, in this embodiment, be comprised of plural back sections. At a location intermediate the length of the sun visor back, such as at the center of the sun visor, the plural back sections may engage one another. For example, an inner end portion of one sun visor back section may overlap an inner end portion of another sun visor back section. One of the inner end portions may define a recessed shelf which is overlapped by the other of the inner end portions.

As another aspect of an embodiment, the sun visor may have an average distance or height d between the top and bottom edge portions of the sun visor front. In addition, the vehicle front surface section desirably substantially follows the contour of the windshield for a distance equal to at least d beyond the portion of the vehicle front section intersected by a projection of the sun visor top edge portion on to the vehicle front section in a direction normal to the contour followed by the vehicle front surface section. For example, a best fit line for a location on the front surface section may be found by, for example, averaging a plurality of points along a vertical section of the vehicle front surface. A projection of the sun visor top edge portion may be taken along a line perpendicular to this best fit line and onto the vehicle front surface to determine the intersection of the projection of the sun visor top edge portion with the vehicle front surface section.

In addition, in an aspect of an embodiment, a vertical section may be taken through the sun visor and the front vehicle section. The contour followed by this vertical section of the vehicle front surface may be approximated such as a best fit or first line. A first distance A may be defined to be the length of the shortest line normal to the first lines and the average back surface contour along the vertical section at any location which is no greater than 75 percent of the distance d from the bottom edge portion of the sun visor front. By average back surface contour, it is meant the contour of the back surface of the sun visor back excluding abrupt projections and projections designed to accommodate lights recessed into the front of the sun visor. Desirably any such abrupt projections and light accommodating projections have curved surfaces to minimize turbulence. In addition, a second distance C may be defined to be the length of the shortest line normal to the first line and the average major back surface contour of the sun visor front along the vertical section at any location greater than 75 percent along the distance d from the bottom edge portion of the sun visor front. In one specific embodiment, the distance C is no greater than the distance A . Desirably, the distance C is equal to at least 0.54A and more desirably the distance C ranges from about 0.6A to about 0.8A. Based on two dimensional computer modeling, a particularly desirable configuration is where the distance C is equal to 0.76A.

A particularly desirable configuration of sun visor is one in which the back comprises a back surface which is configured to provide positive lift, acting in a direction approximately normal to the back surface of the sun visor, in response to air flow passing along the sun visor front and sun visor back as the vehicle travels in a forward direction at least at selected speeds (for example, at highway speeds of 55–65 miles per hour).

As a further aspect of an embodiment, the top edge portion of the sun visor front may curve inwardly toward the vehicle front surface section.

In addition, in a desirable embodiment, the sun visor is comprised of a sun visor front and a sun visor back and wherein the sun visor back terminates below the top edge portion of the sun visor front member.

Desirably, in accordance with certain embodiments, the sun visor may have a transition back portion which, together with any exposed portion of the major back surface of the sun visor front located above the transition back portion, is generally arched in vertical section. More desirably, these surfaces are configured to be generally concave in vertical section relative to the vehicle front surface section.

As another aspect of an embodiment, a transition back portion comprises an upper edge portion and is designed such that at least a major portion of the upper edge portion is coupled to or intersects the major back surface of the sun visor front at a location which is at least one-half of the distance between the sun visor front top and bottom edge portions as measured from the bottom edge portion. More desirably, at least a major portion of the upper edge portion is coupled to or intersects the major back surface of the sun visor front at a location which is at least one-third of the distance between the sun visor front top and bottom edge portions as measured from the top edge portion of the sun visor front. In a particularly desirable embodiment, at least a major portion of the upper edge portion of the transition back portion is coupled to or intersects the major back surface of the sun visor front at a location between one-half and one-fourth of the distance between the sun visor front top and bottom edge portions as measured from the top edge portion of the sun visor front. As another aspect of an embodiment, the transition back portion terminates at such location.

In certain embodiments of a sun visor, the back surface of the sun visor is desirably curved without abrupt angled transitions. The sun visor may be of unitary one-piece construction. However, more desirably the sun visor is comprised of a sun visor front member with bottom and top edge portions and a sun visor back which is coupled to the sun visor front member. The sun visor back comprises a first major surface portion which is oriented to face the back surface of the front member. In addition, the sun visor back has at least a major portion of a second surface which is oriented toward and generally faces a front section of the vehicle when the sun visor is mounted to the vehicle. The sun visor front member and sun visor back may together define at least one elongated marker light wiring receiving passage extending along at least a major portion of the length of the sun visor. One or more pockets may also be defined to accommodate lights mounted to the sun visor front member and which are recessed into the sun visor. The sun visor back may, in one form, comprise at least two sun visor back sections. Inner end portions of such sun visor back sections may each define a portion of a support bracket receiving opening. Desirably, the second or back surface of the sun visor back and the sun visor front member are configured so as to provide lift acting in a direction approximately normal to the back of the sun visor when the vehicle travels forward. This lift results from air flow past the exposed surfaces of the sun visor front member and sun visor back when the sun visor is mounted to the vehicle and the vehicle is moving forwardly at least at selected speeds.

In a particularly desirable embodiment, a sun visor comprises a sun visor body with a front and back with the back facing and being spaced from the vehicle roof section. The back may comprise rear surface defining means configured and positioned relative to a section of the vehicle roof so as to create a positive lift in a direction approximately normal to the back surface as air flows past the front and back of the sun visor when the vehicle travels forward at least at certain speeds.

Again, the present invention is not limited to the specific embodiments described herein, but encompasses novel and non-obvious aspects of sun visors, alone and in various combinations with one another, as set forth in the claims below.

DETAILED DESCRIPTION

Figures 5, 6, 7:
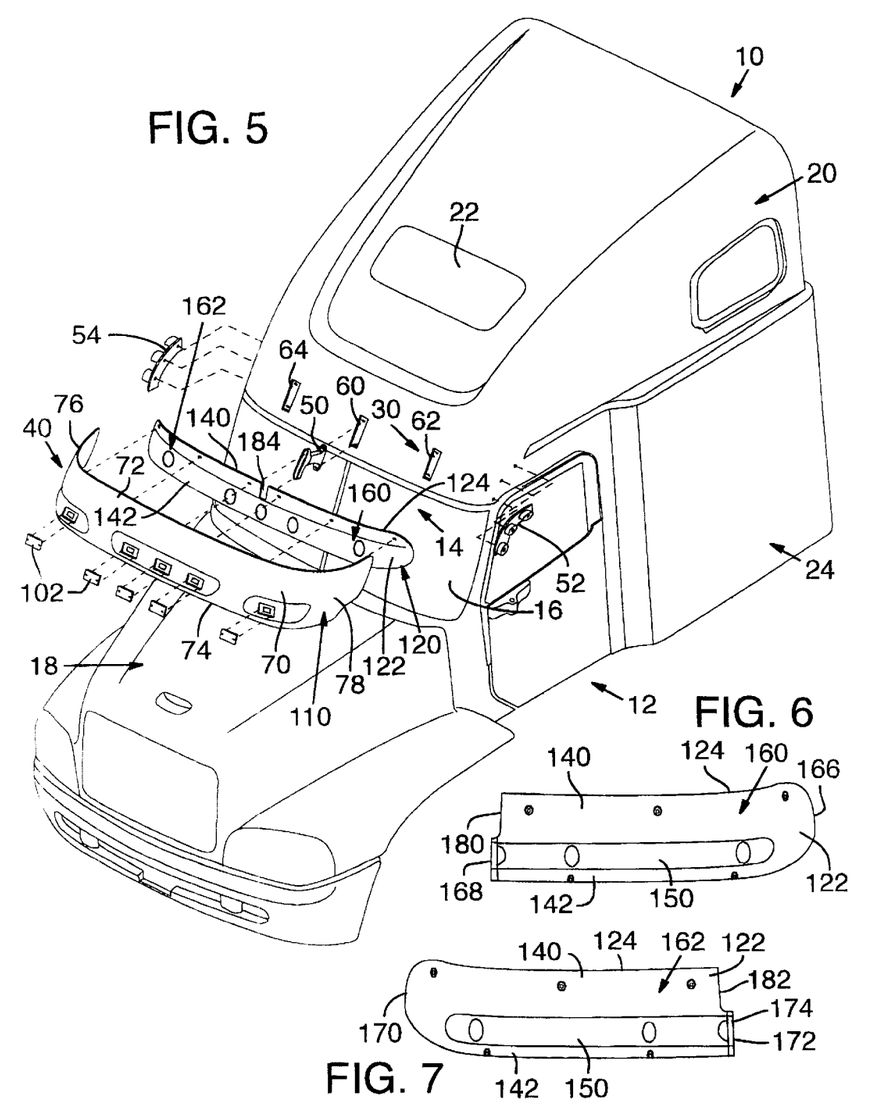
FIG. 5 is a exploded view of the sun visor of FIG. 4, shown exploded from a truck to which the sun visor is to be mounted.
FIGS. 6 and 7 illustrate exemplary sun visor back sections in embodiments where a plural section back is used in the sun visor.

FIGS. 1–3 and 5 illustrate a portion of a vehicle which may, for example, be a truck 10. The illustrated truck 10 has a cab 12 with an upwardly sloped windshield 14 having an outer surface 16 which extends upwardly from a forwardly extending trunk portion 18 of the truck 10. The windshield 14 may be of any suitable design and may be of single or plural piece construction. The illustrated truck 10 is of a raised roof variety with a roof defining section 20, which may have a window 22 therein to allow the entry of light into the interior of the truck. As best seen in FIG. 5, the truck 10 in the illustrated example in these figures has an extended cab with a rear sleeper compartment area indicated by the number 24 in FIG. 5. The roof 20 has a front roof section 30 which extends above the windshield 14 and which, in the illustrated embodiment, generally follows the contour of the windshield in an upward direction for a distance before flattening out to form the roof of the vehicle. Trucks of this configuration are conventional. One such truck is illustrated in U.S. Pat. No. 5,836,640 to Hurayt et al., which is incorporated by reference herein in its entirety.

It should be noted that truck 10 may be of the so-called day cab or midhigh roof varieties. A typical day cab truck has a shorter roof than a raised roof truck. For example, a day cab truck may have a roof line shown by the dashed line 32 in FIG. 18. In addition, in such a truck, the front section 30 of the vehicle above the roof may be formed by, for example, a roof-mounted fairing, such as indicated schematically at 34 in FIG. 18. In this case, front section 30 comprises a portion 36 of the forward surface of the fairing 34 and a portion 38 of the truck front surface which is immediately above the windshield.

Figure 3:
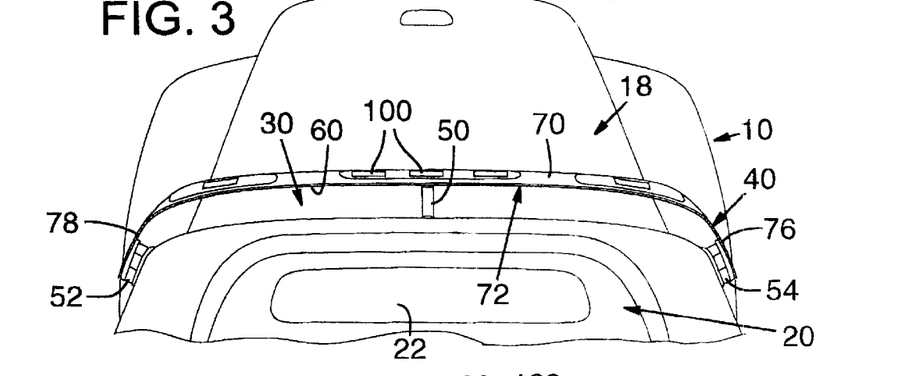
FIG. 3 is a view looking downwardly from a roof portion of the truck of FIG. 1 and toward the hood of the truck.

Returning to FIGS. 1–5, the truck 10 is shown with one embodiment of a sun visor 40 shown mounted to the front vehicle section 30. Plural supports, such as a central support 50 and side brackets 52,54, may be used to mount the sun visor to the vehicle. As shown in FIG. 3, the sun visor is mounted with a back surface 60 spaced from vehicle front section 30 typically at least across the front of the windshield. A sun visor 40 is thus mounted to shade an upper portion of the windshield from sunlight. Any suitable supports may be used for coupling the sun visor to the vehicle. The supports 50,52 and 54 may be identical to supports shown in U.S. Pat. No. 5,836,640. Alternative constructions may also be used. Some alternative constructions are shown in FIG. 3 of U.S. Pat. No. 5,836,640 as additional examples.

As can be seen in FIG. 5, support 50 may be mounted to vehicle front surface with the base of support 50 being positioned within an area 60 recessed into the vehicle front surface. Additional recessed areas 62,64 are shown in FIG. 5 as the windshield may be coupled by a plurality of supports, each positioned within an associated recess, to the front vehicle section. The recesses 60, 62 and 64 are optional.

Figure 4:
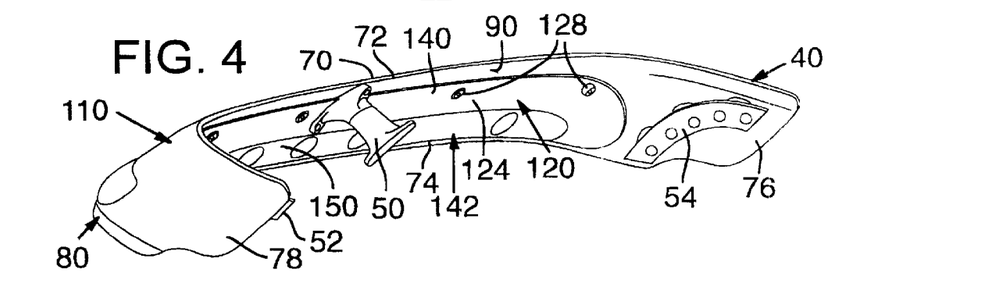
FIG. 4 is a rear perspective view of a sun visor in accordance with an embodiment.

The sun visor 40 comprises an elongated major front surface 70 which desirably extends generally across the windshield. Front surface 70 has a major surface portion which desirably is substantially parallel to the roof section. Throughout this disclosure, the phrase "major portion" means, at least fifty percent of the referenced feature. Thus, at least fifty percent of the front surface 70 is substantially parallel to the front section 30 of the vehicle. More desirably, virtually all (in this disclosure meaning at least eighty percent) of the portion of the sun visor spanning the windshield has a front 70 which is substantially parallel to the front section 30. The sun visor front comprises upper and lower edge portions 72,74 and respective end portions 76,78. The lower edge portion 74 may comprise an inwardly directed or tapered lower edge section 80 (see for example FIGS. 4, 8 and 9). In addition, the uppermost edge 84 of edge portion 72 may be curved or otherwise directed inwardly toward the front surface of vehicle section 30, as best seen, for example, in FIG. 8. The illustrated front portion of the sun visor 40 also comprises a major back surface 90, opposed to surface 70, and extending along the back of the sun visor front. Surface 90 desirably at least spans the length of the windshield. As best seen in FIG. 4, one illustrated form of sun visor is of a generally U-shaped configuration, although the side wing portions of the sun visor may be eliminated in a less desirable application, with the sun visor then terminating without wrapping around the side of the vehicle cab.

Figures 1, 2:
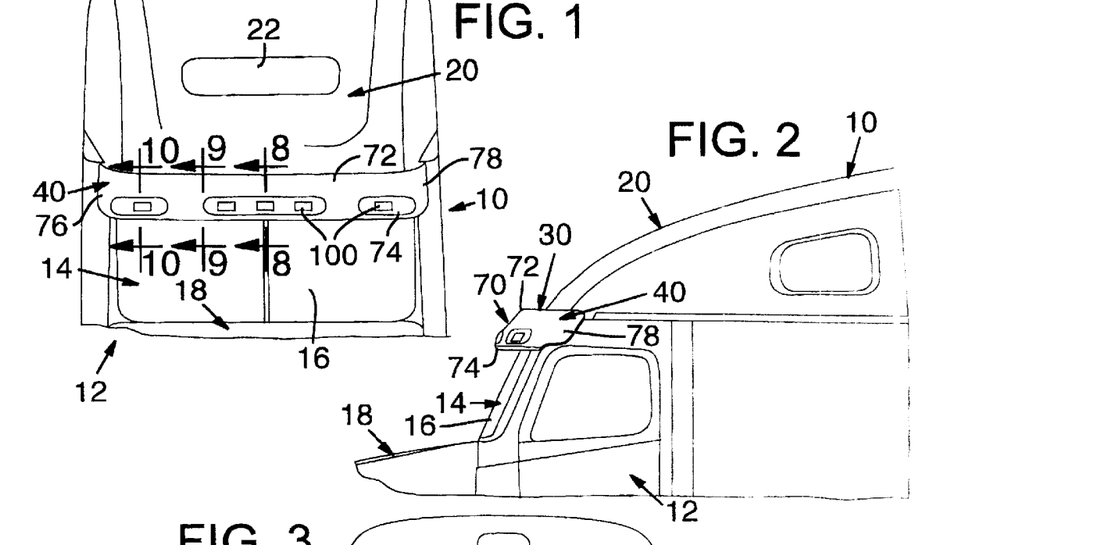
FIG. 1 is a front view of a raised roof truck having an embodiment of a sun visor mounted thereto.
FIG. 2 is a side elevation view of a portion of the truck of FIG. 1.
Figure 8:
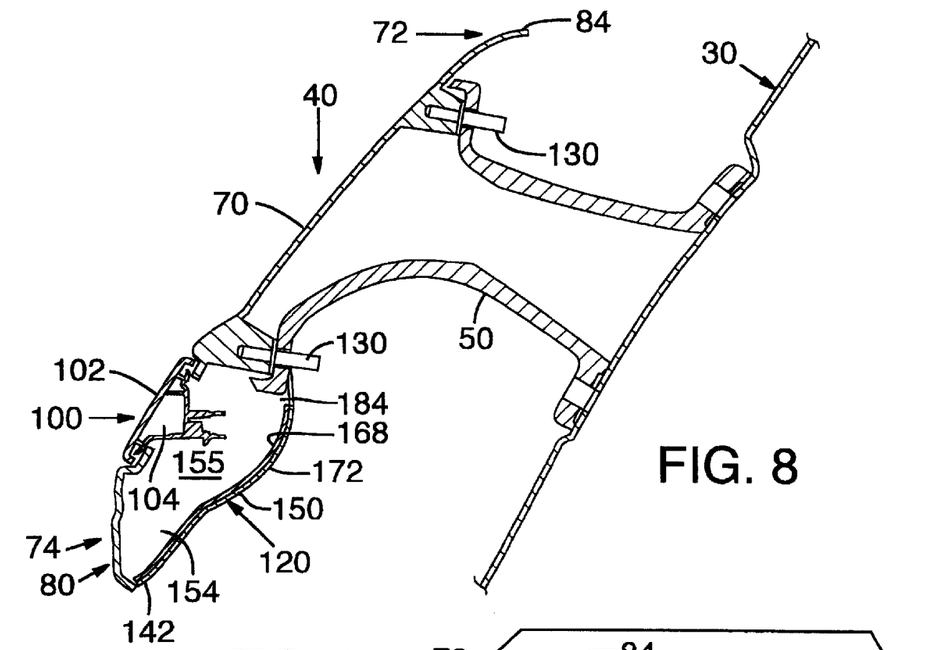
FIG. 8 is a vertical sectional view through the sun visor of FIG. 1, taken along line 8—8 of FIG. 1.

With reference to FIG. 1 in particular, a plurality of marker or other lights, some being indicated at 100 in FIG. 1, may be included in the sun visor. Lights 100 may be recessed into the sun visor and may include lens covers which are flush or substantially flush with the front of the sun visor. FIG. 5 illustrates a number of these lens covers 102. As best seen in FIG. 8, for example, a lens cover 102 is shown together with a lamp 104 which extends into or is recessed into an enlarged lower portion of the sun visor 40.

Although the sun visor 40 may be of a single piece construction, desirably the sun visor is comprised of a front member 110 and a back or member 120. Surface 70 is, in this embodiment, the front surface of front member 110 and surface 90 is, in this embodiment, the back surface of front member 110. Back 120 (as best seen in FIG. 4) is elongated and extends generally from side-to-side along the back surface 90 of front member 110. The back 120, in the illustrated form, extends across the area of the sun visor above the windshield. Back 120 comprises a first or front major surface 122 (FIG. 5) which is positioned adjacent to surface 90 of front member 110. In addition, back 120 includes a rear or second major surface 124 which faces the vehicle section 30 when these sun visor components are assembled. Back 120 may be coupled to front 110 in any suitable manner using adhesives, mechanical fasteners, or interfitting connections. In the illustrated embodiment, mechanical fasteners are utilized with the location of a few of these fasteners being indicated by the number 128 in FIGS. 4 and 9. The sun visor may be coupled in any suitable manner to the support. For example, mechanical fasteners 130 may be used, such as shown in FIG. 8. Back 120 comprises an upper edge portion 140 and a lower edge portion 142. In a desirable embodiment, the back surface 124 lacks abrupt angled surfaces which can add turbulence as air flow passes over the back surface when the truck 10 moves forwardly. Thus, in such an embodiment, desirably all of the back surface 124 is comprised of curved surfaces as opposed to including abruptly angled surfaces.

Figure 9:
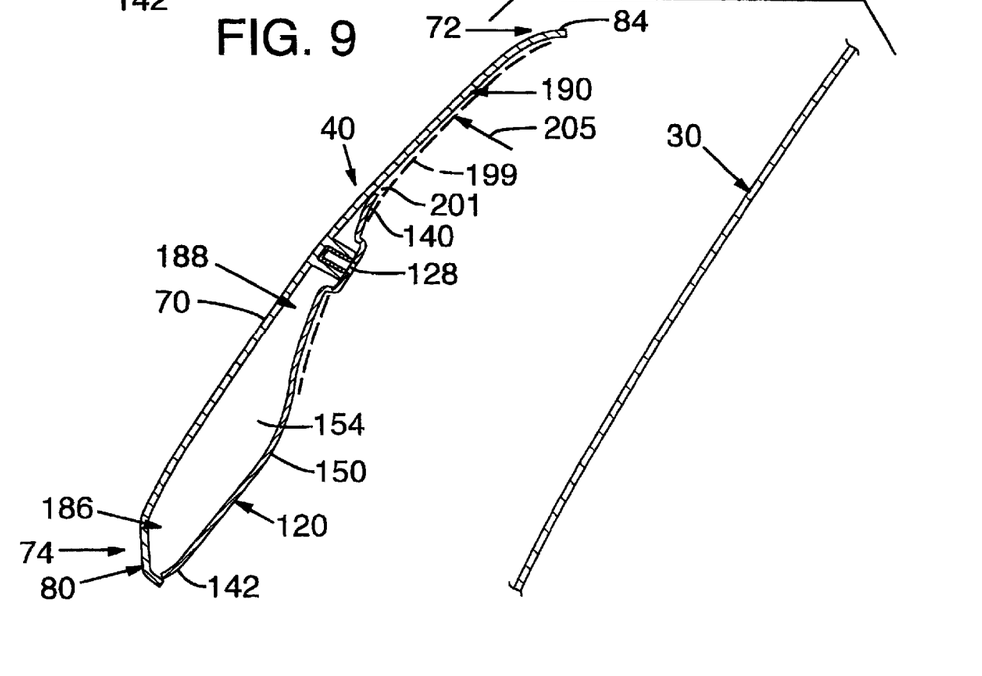
FIG. 9 is a vertical sectional view through a portion of the sun visor of FIG. 1, taken along line 9—9 of FIG. 1.
Figure 10:
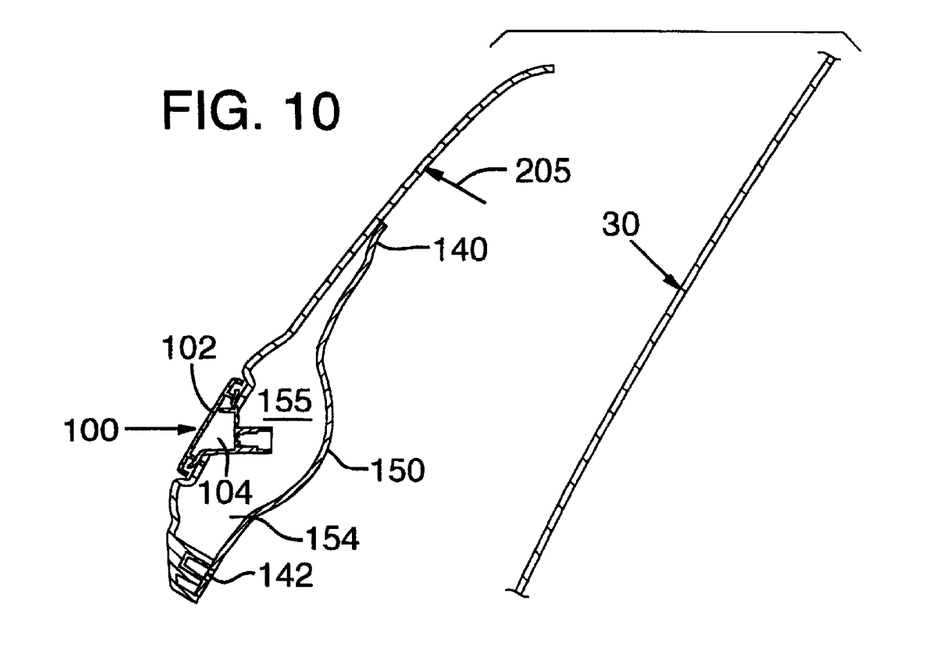
FIG. 10 is a vertical sectional view through a portion of the sun visor of FIG. 1, taken along line 10—10 of FIG. 1.

The back may comprise an outwardly bulged or projecting portion 150 so as to define an elongated passageway between the back surface 90 and back member 120 through which electrical wiring for the lights 100 may pass. Although the passageway may assume different configurations, sections through portions of the passageway are shown in FIGS. 8, 9 and 10 with the passageway being indicated at 154 in these figures. As can be seen in FIGS. 8 and 10, the passageway 154 may be enlarged rewardly to a greater extent in the region where lamps 104 are located to provide one or more pockets (e.g., 155) having a greater depth for receiving the recessed lamps. These pockets may be elongated to receive plural adjacent lamps if desired. Typically more space is required for incandescent lamps than for LED lamps. In the latter case, and in other applications (e.g., where no lamps are used or lamps are not recessed into the sun visor), the enlarged pockets may be eliminated.

The front member 110 and back 120 may be of single piece monolithic unitary construction. Alternatively, plural piece constructions may be used. In a particularly desirable approach, the front member is of a single piece construction while back 120 is comprised of elongated plural back sections, such as two sections indicated at 160,162 in FIG. 5. Sections 160,162 are respectively shown in FIGS. 6 and 7. Section 160 comprises an outer end portion 166 and an inner end portion 168. Section 162 comprises an outer end portion 170 and an inner end portion 172. The inner ends 168,172 of these two back sections are typically positioned adjacent to one another and may be located at the center of the back. Inner ends 168,172 may engage one another. In the embodiment shown in FIGS. 6 and 7, inner end 168 overlaps a recessed section 174 of inner end 172 when the sections are mounted to the front member of the sun visor. Portions 180 and 182 are removed from the upper end of the respective inner end portions 168,172 to provide an opening (indicated at 184 in FIG. 5) to accommodate the support 50. If additional supports like the support 50 are used, additional openings may be provided in the back sections 160, 168 to accommodate these supports. The overlapping innerconnection of end portions 168,172 is apparent from FIG. 8.

Figures 11, 12, 13:
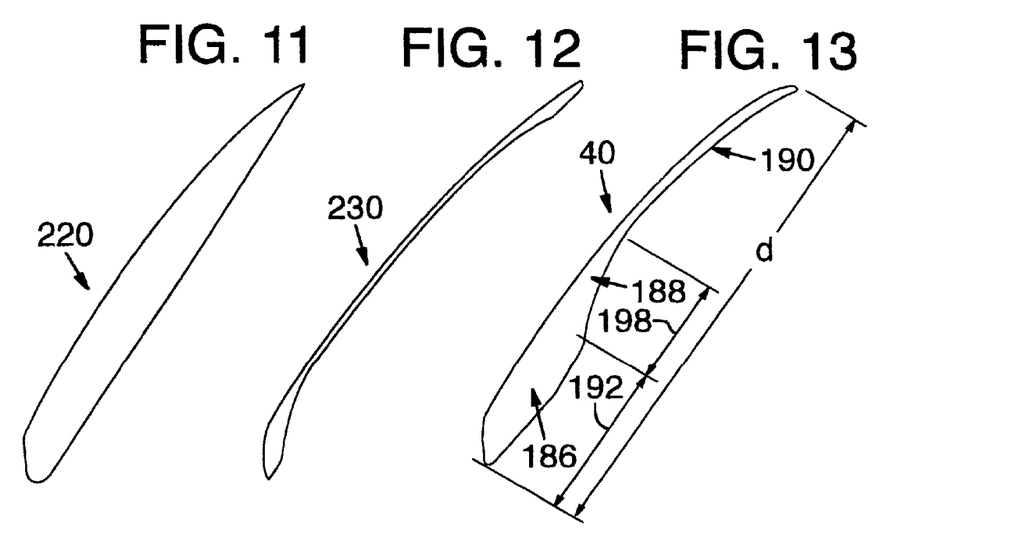
FIGS. 11–16 are vertical sectional views through alternative forms of sun visors.

As best seen in FIG. 4, the back 120 together with the sun visor front 110 defines an enlarged lower section. In addition, the back comprises a transition region extending upwardly from the lower section of the back. FIG. 13 illustrates a sun visor 40 with a lower section 186, a transition section 188, and an upper section 190. The FIG. 13 construction may, as an optional alternative, comprise a one-piece solid, as opposed to hollow, sun visor construction. Desirably, based upon computer modeling, the lower enlarged section 186 extends from fourteen percent to sixty-five percent of the total sun visor height d. The height of the enlarged lower portion is indicated at 192 in FIG. 13. More desirably, the lower section is about thirty to forty percent of the total sun visor height d. The transition section of the back surface of the sun visor 40 in FIG. 13 is indicated at 188 and extends for a height 198. The transition section is generally that section of the back surface of the sun visor where the sun visor tapers in width. That is, where the sun visor back surface and sun visor front surface converge toward one another. Desirably, the transition section ranges from about twenty to about thirty percent of the overall height d of the sun visor. The remainder of the sun visor back surface above the transition section comprises the upper section.

With reference to FIGS. 8, 9 and 10, it is apparent that in these embodiments the transition back portion and exposed portions of the back surface 90 of the sun visor front above the transition back portion are generally arched in vertical section. This general arched shape is indicated by dashed line 199 in FIG. 9. As is apparent from FIG. 9, the transition portion and portion of the major back surface of the sun visor front which is above the transition back portion is of a generally concave vertical section relative to the vehicle front surface section 30.

As also apparent from FIG. 9, the illustrated back section 120 includes a transition portion which converges toward the back surface of sun visor front member and has an upper edge 201 which is indirectly coupled to or which intersects the front member at a location below the upper end 84 of the sun visor front member. Desirably, at least a major portion of the upper edge of the transition back portion is coupled to or intersects the major back surface of the sun visor at a location which is at least one-half of the distance between the sun visor front top and bottom edge portions measured from the bottom edge portion. More desirably, at least a major portion of the upper edge of the transition back portion is coupled to or intersects the major surface of the sun visor front at a location which is at least one-third of the distance between the top and bottom edge portions of the sun visor front member when measured from the top edge 84. That is, at least a major portion of edge 201 is located desirably at least one-third of the distance of the overall height of the sun visor below edge 84. More desirably, virtually all of the entire edge 201 is positioned at such location and more desirably the entire edge 201 is at such location at least in those sections where a top edge 201 is not removed to accommodate supports or other structures. Alternatively, at least a major portion of the upper edge of the transition back portion and more desirably virtually all of the upper edge of the transition back portion intersects or is coupled to the major back surface of the sun visor front at a location between one-half and one-fourth the distance between the sun visor top front and bottom edge portions as measured from the top edge portion. In addition, desirably, except in locations where supports or other obstructions are present, the entire top edge 201 of the sun visor is coupled to or intersects the front member of the sun visor at a location above the lights 100.

In the configuration shown in FIGS. 9 and 10, the back surface of the sun visor cooperates with the front surface of the sun visor to provide a positive lift in a direction approximately normal to the back surface (see arrow 205) as a result of air passing along the front and back surfaces of the sun visor when the vehicle is moving forward at least at certain speeds, for example, at highway speeds of from 55 mph to 65 mph.

Analysis of the FIGS. 8, 9 and 10 designs indicates drag is reduced with these designs in comparison to the sun visor design shown in U.S. Pat. No. 5,836,640 without the lift generating back surface. For example, at a vehicle speed of 55 mph, three dimensional analysis of the FIG. 9 design indicated a drag reduction improvement of 0.62 percent. At a vehicle speed of 65 mph, the drag reduction was indicated as a 0.93 percent improvement. The estimated mile per gallon (diesel fuel) improvement is 0.043 mpg at 55 mph and 0.065 mpg at 65 mph. Assuming diesel prices are at $1.50 per gallon, this translates to a savings of approximately $130 per 100,000 miles at 55 mph and $197 per gallon at 65 mph. These savings seem insignificant until one considers the fact that trucks travel a substantial number of miles and many truck fleets have numerous trucks. For example, for a 1,000 truck fleet with vehicles averaging 200,000 miles per year, the savings at 55 mph would be about $260,000 and at 65 mph would be about $394,300. Again, these are estimates based on three-dimensional analysis and would vary with the configuration of the sun visor, but do indicate the potential benefit from drag reduction sun visors mounted to a truck in accordance with certain embodiments.

As a way of comparison, the sun visor configuration 220 of FIG. 11 lacks a contoured back surface with the arched transition and upper sections. This design in effect has an enlarged section extending along the full height of the sun visor. Two-dimensional computer analysis indicates that this design generates virtually no useful lift in a direction approximately normal to the back surface of the sun visor.

The design 230 of FIG. 12 lacks the enlarged lower section. Two-dimensional computer analysis of the design of FIG. 12 indicates that this design generates extensive useful lift in a direction approximately normal to the back surface of the sun visor. However, zones of heavy turbulence that would exist between the back surface of sun visor 230 and the adjacent vehicle front section are believed to counteract any useful benefit.

Figures 14, 15:
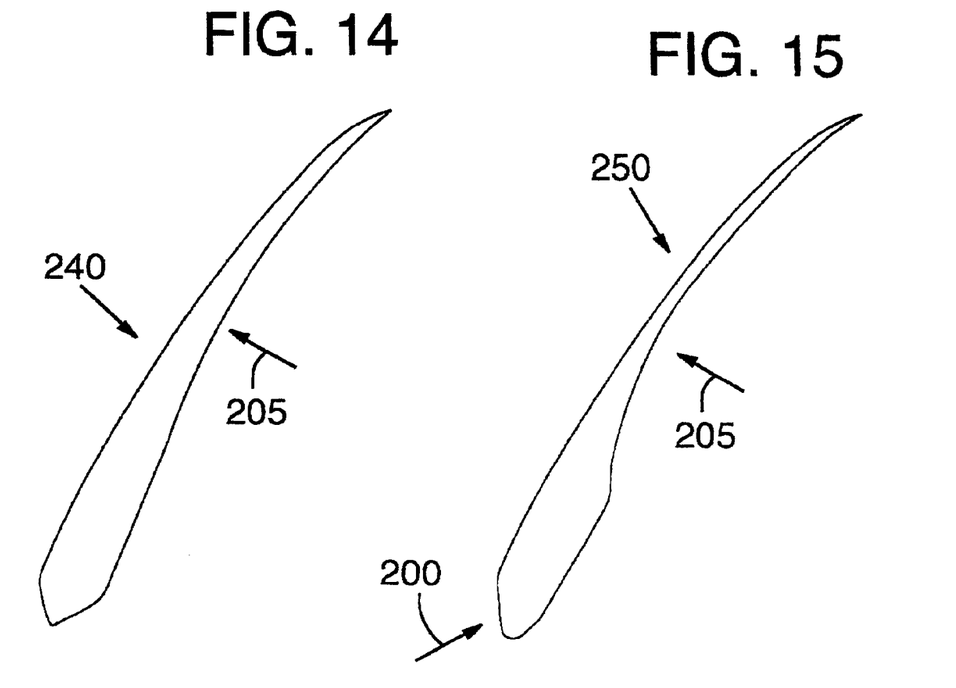

The design of FIG. 14, based on two-dimensional computer analysis, indicates that this design would successfully create some useful lift in a direction 205 approximately normal to the sun visor back surface and which would assist in reducing drag. FIG. 15 contains a more rapidly tapered transition region in the back surface and, as indicated by computer two-dimensional analysis, provides a greater lift in direction 205 than the design of FIG. 14 for positive angles of air flow attack. A positive air flow attack angle occurs when air flow approaches a sun visor shape from an angle above the centerline of the sun visor shape, such as indicated by arrow 200 in FIG. 15. This angle of attack is typical for most heavy duty truck applications (Class 4–8 trucks) having sun visors. The FIG. 15 design generates some increased turbulence due to the more abrupt angle between the enlarged lower portion and the transition section.

Figure 16:
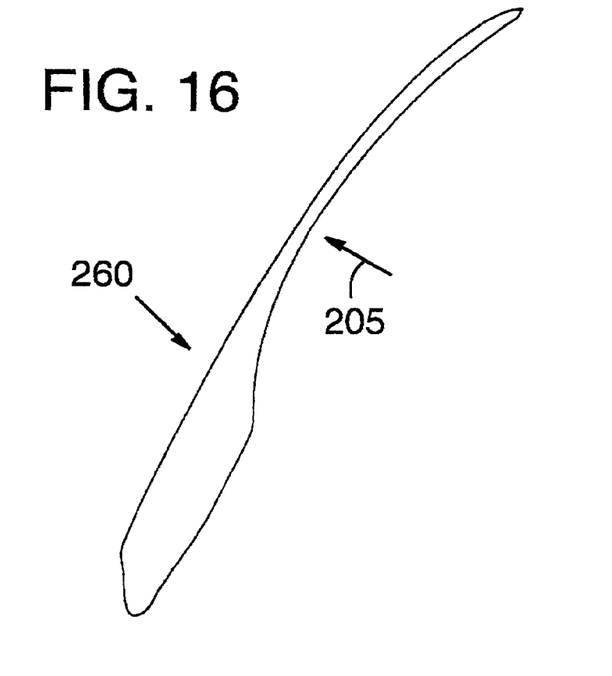

FIG. 16 illustrates a modification of the design 260, in which the sun visor has a back surface with a more gradual transition (than in the FIG. 15 design) from the enlarged lower section to this transition section. Based upon computer two-dimensional analysis, the design 260 diminishes the turbulence of the FIG. 15 design without any significant reduction in the generation of useful lift in direction 205.

Figures 19, 20:
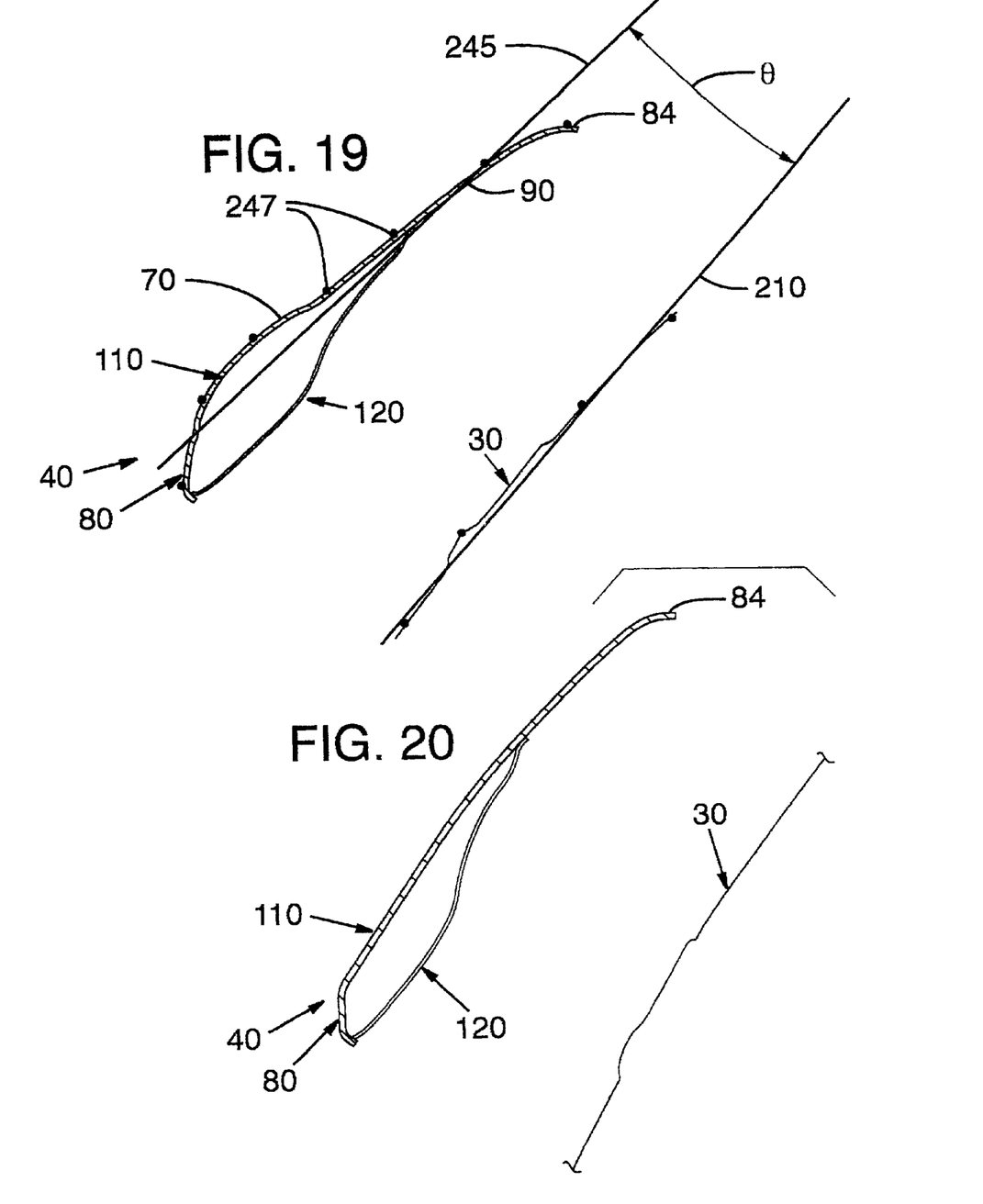
FIG. 19 illustrates a sun visor and portion of a front vehicle section together with lines useful in describing a desirable mounting of the sun visor with the front major surface of the sun visor substantially parallel to a front surface of the front vehicle section.
FIG. 20 illustrates a sun visor configuration similar to FIG. 9, but without fasteners coupling a back section of the sun visor to a sun visor front member.

FIG. 20 is like FIG. 9 except this is an example of a design 40 at a location separate from any lamps and separate from any mechanical fasteners utilized to connect back and front components 110,120 of the sun visor together.

Figures 17, 18:
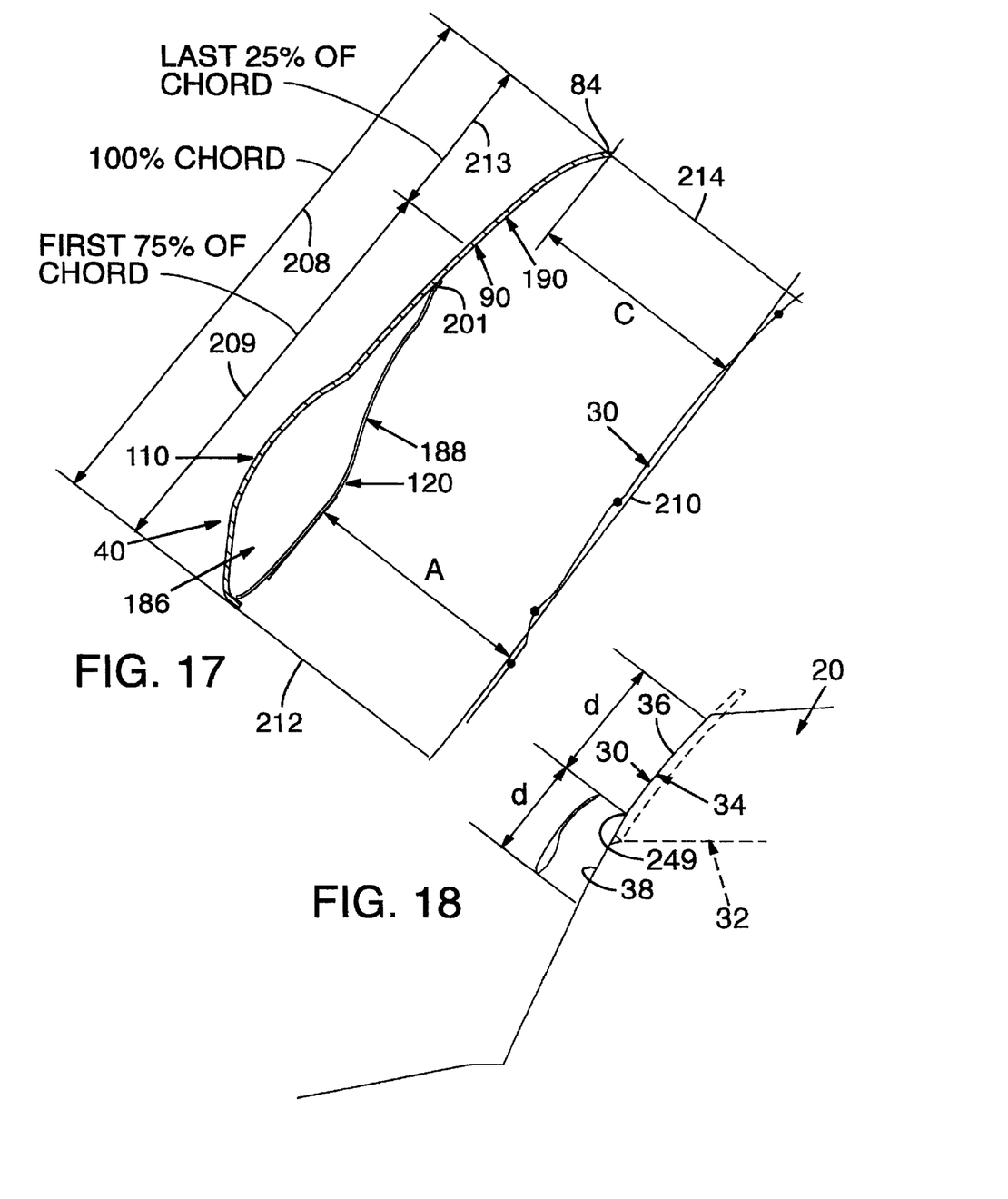
FIG. 17 illustrates a vertical sectional view through a sun visor embodiment with lines thereon which are provided for purposes of describing desirable orientations of the sun visor and configurations of the sun visor back surface relative to a front surface section of the vehicle beneath the sun visor.
FIG. 18 is a schematic illustration of a sun visor which is provided to illustrate a desirable positioning of the sun visor relative to a roof and/or roof extension (e.g., a fairing) of a vehicle.

FIG. 17 illustrates a particularly desirable spatial relationship between a sun visor 40 and the front surface 30 of the vehicle. More specifically, a first line is indicated at 210 which approximates an average contour of the vehicle front surface along a vertical section taken through the sun visor and through the vehicle front surface and immediately beneath the sun visor 40. To generate line 210, in one approach, a best fit or average location of the line may be determined. For example, at least four spaced apart points on the surface 30 may be taken with the location of the line 210 being a best fit line for the selected areas. For example, a mean line generating software program may be used (Catia®, Excel®, or other software programs have that capacity) to determine the slope of the line and thus the location of the best fit line 210. Line 210 may be otherwise determined. In FIG. 17, the overall height of the sun visor is indicated as 100% chord. This corresponds to the distance d in some of the other figures and is indicated by line segment 208. The length of chord 208 is determined as the distance between a first line 212, normal (perpendicular) to line 210, which intersects the lowermost edge of the sun visor and a second line 214, normal to line 210, which intersects the upper end 84 of the sun visor. FIG. 17 also illustrates the first 75 percent of the chord 208, as line segment 209, which corresponds to the distance from the lower end of the sun visor or line 212 to a location three-quarters of the way along chord line 208. The last twenty-five percent of the chord 208 is designated by line segment 213 in FIG. 17. Segment 213 corresponds to a distance greater than three-quarters of the way along chord 208 from line 212.

A sun visor back surface along the vertical section has an average contour which is obtained by ignoring any abrupt rearward projections from the back surface and enlarged lamp accommodating projections. In the configuration shown in FIG. 17 there are no such projections. In FIG. 8, there is an enlarged lamp accommodating projection which defines pocket 155. In addition, in this FIG. 17 example, the sun visor back 120 has an upper edge 201 that terminates below the top edge portion 84 of the sun visor front member such that a portion of the back surface 90 of the sun visor front member 110 is exposed at the back of the sun visor. A first distance A is defined to be the length of the shortest line normal to the line 210 and the average back surface contour at any location no greater than seventy-five percent of the distance from the bottom edge portion. In other words, the line A is the shortest distance that exists between the average back contour of the sun visor along the distance of the length of chord 209. In addition, a second distance C is defined to be the length of the shortest line normal to the line 210 and the average major back surface along the last twenty-five percent of the chord, that is along line segment 213. Desirably, the distance C is no greater than the distance A. Based on computer analysis, particularly desirable results are obtained wherein the distance C is at least equal to 0.54 times the distance A. More desirably, the distance C ranges from about 0.6A to about 0.8A. Computer modeling, indicates that a specifically desirable ratio is where the distance C is equal to 0.76A. Desirably, the relationships of FIG. 17 exist at least at a majority of, and more desirably at least at virtually all locations along the length of that portion of the portion of the sun visor which spans across the front of the windshield.

With reference to FIG. 18, desirably the front section 30 extends upwardly substantially along the contour of the windshield a distance d beyond the upper end of the sun visor, wherein d is the overall length of the sun visor. Although a sun visor of any of the constructions described above are beneficial, to achieve the desired positive lift, the front vehicle surface should extend above the upper end of the sun visor at distance d, either utilizing a portion of a raised roof, a mid-high roof or a fairing or other construction. This extension distance d may be measured from the location of a projection of the top edge portion of the sun visor onto the vehicle front section (e.g., from location 249 in FIG. 18).

FIG. 19 illustrates a desirable relationship between line 210 and the front surface 70 of the sun visor 40 with at least a major portion of the front surface being substantially parallel to the front vehicle section. The first line 210 may be determined as explained above. In addition, the contour of the front surface 70 may be determined by defining a best fit line 245 for the front surface along the same vertical section that intersects line 210. A plurality of points may be selected along the front surface 70. For example, seven equidistant points may be selected as indicated by the points in FIG. 19, some of which are indicated at 247. These points would be on the surface 70. Mean line generating software may be used to determine the slope and location of line 245. Other contour defining algorithms may also be used. The angle theta is the angle between lines 210 and 245. It is desirable that theta range from −4° to +11°. In this case, zero degrees indicates lines 210 and 245 are parallel, a positive angle corresponds to the upper end of line 245 being pivoted toward line 210 from parallel (the top 84 of the sun visor tilted toward the vehicle), and a negative angle corresponds to the upper end of line 245 being pivoted away from line 210. Desirably this relationship is true for at least a majority of, and more desirably for at least virtually all, locations along the length of that portion of the sun visor which spans the front of the windshield.

Having described the principles of our invention with reference to several illustrated embodiments, it should be apparent to those of ordinary skill in the art that the invention may be modified in arrangement and detail without departing from its principles. We claim all such modifications that fall within the scope and spirit of the following claims.

We claim:

1. An elongated sun visor for mounting to a vehicle in a position to shield a portion of an upwardly extending windshield of the vehicle from overhead sunlight, the vehicle comprising an upright vehicle front section having a vehicle front surface section extending upwardly above the windshield, the vehicle front surface section substantially following the contour of the upwardly extending windshield, the sun visor comprising:

an elongated sun visor front having a length and comprising top and bottom edge portions, the sun visor comprising a first major front surface and a second major back surface;

plural lights coupled to the sun visor front so as to be visible from the front of the vehicle when the lights are operated;

a sun visor back extending at least along a major portion of the major back surface of the sun visor front, the sun visor back comprising a lower back portion which together with a lower portion of the sun visor front defines an elongated enlarged lower sun visor section, the enlarged lower sun visor section defining at least one elongated wiring receiving passage for receiving electrical wiring for the lights, the sun visor back comprising a transition back portion extending upwardly from the lower back portion and converging toward the second major back surface of the sun visor front, the sun visor back comprising an upper edge portion with at least a major portion of the upper edge portion of the sun visor back being positioned at a location above the lights; and at least one sun visor support for coupling to the vehicle to support the sun visor with at least a major portion of the first major front surface being substantially parallel to the vehicle front surface section.

2. A sun visor according to claim 1 in which the sun visor back comprises at least one back section which is a separate piece from the sun visor front and which is coupled to the sun visor front.

3. A sun visor according to claim 2 in which the sun visor back is comprised of plural back sections.

4. A sun visor according to claim 1 in which the sun visor has an average distance of d between the top and bottom edge portions and in which at least a majority of the vehicle front surface section across the front of the windshield substantially follows the contour of the windshield for a distance equal to at least d beyond the portion of the vehicle front surface section intersected by a projection of the sun visor top edge portion onto the vehicle front surface section.

5. A sun visor according to claim 1 wherein the sun visor front has an average distance d between the top and bottom edge portions, the sun visor back comprising a sun visor rear surface, the sun visor rear surface having an average rear surface contour along a vertical section through the sun visor, the second major back surface having an average back surface contour along the vertical section through the sun visor, the sun visor back terminating below the sun visor front top edge portion such that a portion of the second major back surface is exposed at the back of the sun visor, wherein the contour followed by the vehicle front surface section in the plane of the vertical section is approximated by a first line, a first distance A being defined to be the length of the shortest line normal to the first line and the average back surface contour at any location no greater than seventy-five percent of the distance d from the bottom edge portion, a second distance C being defined to be the length of the shortest line normal to the first plane and the average back surface contour of the exposed portion of the second major back surfaced at any location greater than seventy-five percent along the distance d from the bottom edge portion, and wherein the distance C is no greater than the distance A, and wherein C is no greater than A for at least a majority of all locations along the length of that portion of the sun visor which spans the front of the windshield.

6. A sun visor according to claim 5 wherein the distance C is equal to at least 0.54A.

7. A sun visor according to claim 6 wherein the distance C ranges from about 0.6A to about 0.8A.

8. A sun visor according to claim 7 wherein the distance C is equal to 0.76A.

9. A sun visor according to claim 1 in which the back comprises a back surface configured to provide positive lift acting in a direction approximately normal to the back of the sun visor from air flow passing along the sun visor front and sun visor back as the vehicle travels in a forward direction at least at selected speeds.

10. A sun visor according to claim 1 wherein the top edge portion of the sun visor front curves inwardly toward the vehicle front surface section.

11. A sun visor according to claim 1 wherein the transition back portion and any portion of the second major back surface located above the transition back portion is generally arched in vertical section.

12. A sun visor according to claim 1 wherein the transition back portion and any portion of the second major back surface located above the transition back portion is of a generally concave vertical section relative to the vehicle front surface section.

13. A sun visor according to claim 1 wherein at least a major portion of the upper edge portion of the transition back portion is coupled to the second major back surface at a location which is at least one-half of the distance between the sun visor front top and bottom edge portions.

14. A sun visor according to claim 1 wherein at least a major portion of the upper edge portion of the transition back portion is coupled to the major back surface at a location which is at least one-third of the distance between the sun visor front top and bottom edge portions and from the top edge portion of the sun visor front.

15. A sun visor according to claim 1 wherein at least a major portion of the upper edge portion of the transition back portion is coupled to the second major back surface at a location between one-half and one-fourth the distance between the sun visor front top and bottom edge portions and from the top edge portion of the sun visor front.

16. A sun visor according to claim 1 in which the sun visor back comprises a lower edge portion and a curved back surface extending between the lower edge portion and upper edge portion.

17. A vehicle comprising:
   a windshield;
   an upright vehicle front section surface extending upwardly above the windshield;
   an elongated sun visor coupled to the vehicle and extending at least across the windshield at a location at least partially above the windshield, the sun visor comprising a front surface and a back surface, the back surface being spaced from the windshield, the sun visor also comprising a top edge portion and a bottom edge portion, wherein a distance d is defined to equal the average distance between the top and bottom edge portions of that portion of sun visor extending across the windshield, the sun visor comprising an enlarged bottom portion, the sun visor back surface comprising a top portion and a transition section between the sun visor bottom portion and the top portion, the average height of the transition section extending upwardly at least to a location which is one-half of the distance d, wherein the sun visor is mounted to the vehicle such that the vehicle front section surface extends upwardly and generally along the contour of the windshield for a distance d beyond a projection of the sun visor top edge portion onto the vehicle front section surface.

18. A sun visor for mounting above a windshield of a vehicle comprising:
   an elongated sun visor front member comprising a major front surface and a major back surface, the back surface being opposed to the front surface and at least a major portion of the back surface being oriented toward the vehicle when the sun visor is mounted to the vehicle;
   the sun visor front member comprising upper and lower front member edge portions;
   an elongated sun visor back coupled to the sun visor front member, the sun visor back comprising first and second major surfaces, at least a major portion of the first surface being oriented to face the back surface of the front member and at least a major portion of the second surface being oriented toward the vehicle when the sun visor is mounted to the vehicle;
   the sun visor front member and sun visor back together defining at least one elongated marker light wiring receiving passage extending along at least a major portion of the length of the sun visor; and
   the sun visor back comprising at least two sun visor back sections, a first of said back sections having a first inner end portion and a second of said back sections having a second inner end portion adjacent to the first inner end portion.

19. A sun visor according to claim 18 wherein the first and second inner end portions engage one another.

20. A sun visor according to claim 18 wherein one of the first and second inner end portions overlaps the other of the first and second end portion.

21. A sun visor according to claim 20 wherein the said other of the first and second inner end portions defines a recessed shelf overlapped by said one of the first and second inner end portions.

22. A sun visor according to claim 18 wherein the first and second inner end portions are at the center of the sun visor and each define a portion of a support bracket receiving opening.

23. A sun visor according to claim 18 wherein the second surface of the sun visor back and the sun visor front member are configured so as to provide positive lift acting in a direction approximately normal to the second surface of the sun visor back when the vehicle travels forwardly at least at selected speeds and air flow passes by the exposed surfaces of the sun visor front member and sun visor back when the sun visor is mounted to the vehicle.

24. A sun visor according to claim 18 wherein the sun visor back defines at least one rearwardly projecting light receiving pocket communicating with the passage.

25. A sun visor in combination with a vehicle having a vehicle front with a windshield and a roof section extending above the windshield, the sun visor comprising:
   a sun visor body comprising a front and a sun visor back, the back facing and being spaced from the vehicle roof section; and
   the back comprising rear surface defining means configured and positioned relative to the roof section for creating a positive lift acting in a direction approximately normal to the rear surface as air flows past the front and back of the sun visor when the vehicle travels forward at least at certain speeds.

\* \* \* \* \*